United States Patent [19]

Schindler

[11] Patent Number: 4,698,385

[45] Date of Patent: Oct. 6, 1987

[54] BINDER FOR HIGH SOLIDS AMBIENT CURE COATINGS

[75] Inventor: Frederick J. Schindler, Ft. Washington, Pa.

[73] Assignee: Rohm and Haas Company, Philadelphia, Pa.

[21] Appl. No.: 581,766

[22] Filed: Feb. 23, 1984

[51] Int. Cl.⁴ .................................................. C08F 4/20
[52] U.S. Cl. ................................... 524/733; 524/854; 524/878; 525/245; 525/293; 525/305; 525/920; 526/146; 526/321; 526/323.1; 526/325; 528/364
[58] Field of Search ............ 526/146, 321, 323.1, 526/325; 525/16, 23, 44, 920, 245, 293, 305; 528/364; 524/733, 854, 878

[56] References Cited

U.S. PATENT DOCUMENTS

| | | | |
|---|---|---|---|
| 3,333,021 | 7/1967 | Geipert | 525/16 |
| 3,681,269 | 8/1972 | Heitz | 526/321 |
| 3,900,594 | 8/1975 | Guthrie | 525/922 |
| 3,901,858 | 8/1975 | Sugiyama | 524/854 |
| 3,912,758 | 10/1975 | Weaver | 524/878 |
| 3,935,173 | 1/1976 | Ogasawara | 526/321 |
| 4,406,826 | 9/1983 | Morgan | 524/854 |
| 4,571,420 | 3/1986 | Marks | 525/16 |

FOREIGN PATENT DOCUMENTS 1912426 10/1970 Fed. Rep. of Germany .
2025410 12/1971 Fed. Rep. of Germany .

OTHER PUBLICATIONS

Gush, "Thiol/Acrylate Hybrid Systems", Modern Paint and Coatings, Nov. 1978, pp. 58, 61, 62, 64 and 66.

*Primary Examiner*—C. Warren Ivy
*Attorney, Agent, or Firm*—Marc S. Adler

[57] ABSTRACT

Compositions suitable as binders for high solids, ambient cure coatings, and coating compositions which have high humidity resistance and good weatherability are disclosed herein.

14 Claims, No Drawings

BINDER FOR HIGH SOLIDS AMBIENT CURE COATINGS

BACKGROUND OF THE INVENTION

1. Field of the Invention

This invention is in the field of high solids ambient cure coatings and binder compositions for such coatings.

2. Description of the Prior Art

Acrylate polyene high solids, low emissions coating compositions which cure to solvent resistant durable coatings have been available in the prior art. For example, W. R. Grace and Company has done substantial work in this field as exemplified by its 9311 system described in Gush et al., Thiol/acrylate Hybrid Systems, *Modern Paint and Coatings,* November 1978, 58-66. The W. R. Grace systems as described also in U.S. Pat. Nos. 3,662,023 and 4,120,721 utilize a polythiol containing at least 2 thiol groups per molecule. However, the W. R. Grace system and others such as described by Mitsubishi Rayon in U.S. Pat. No. 4,339,474 require ultraviolet light or other radiation curing.

Hofer et al., U.S. Pat. No. 3,516,976, show an improved redox system for vinyl compounds consisting of a liposalt organic vanadium compound and a mercaptan. Hofer et al. were concerned only with monounsaturated vinyl compounds.

Rosenkrantz et al. Offenlegenschrift No. 2,025,410 laid open Dec. 9, 1971 show unsaturated polyesters in unsaturated monomer solutions cured with vanadium and thioglycolic acid ester accelerators. The Rosenkrantz et al polyesters are condensates of dicarboxylic acids and dihydric alcohols, and do not contain acrylic unsaturation.

SUMMARY OF THE INVENTION

Because of the fact that acrylate coating systems have other advantages, it became an object of the present invention to provide acrylate based high solids, low emissions coatings compositions which can be binders for coatings compositions which cure under ambient conditions without the requirement of radiation to durable solvent resistant high performance cured coatings. Another object of the present invention is to provide coating compositions of the above acrylate type which can be applied outdoors.

It is a further object of the present invention to provide high solids ambient cure coatings compositions and binders therefore which provide coatings which are solvent-resistant and durable and do not require radiation cure.

It is a still further object of the invention to provide binders for coating compositions and high solids low emissions coating compositions which are ambient cure and can be applied to both flat surfaces and non-flat surfaces.

These objects and others as will become apparent from the following disclosure are achieved by the present invention which comprises in part a composition suitable as a binder for high solids ambient cure coatings comprising about 25 to 95% by weight polyunsaturated acrylate or acryloxypropionate monomer having an average of greater than 2 double bonds per molecule, about 5 to 15% by weight multifunctional mercaptan, and vanadium compound providing about 0.001 to about 0.15% by weight vanadium. In another aspect the invention comprises coating compositions comprising said binder which cure at ambient conditions and have high humidity resistance and good weatherability. In a still further aspect the invention comprises coating compositions containing pigments, rheology modifiers and the like along with the above-referenced binder compositions which can be applied and cured at ambient conditions without the requirement of radiation.

DETAILED DESCRIPTION OF THE INVENTION AND THE PREFERRED EMBODIMENTS

The binder compositions of the invention comprise about 25 to 95% by weight polyunsaturated monomer having an average of greater than 2 double bonds per molecule and selected from esters of acrylic acid acryloxypropionic acid, or mixtures thereof. These monomers can be triacrylates, tetraacrylates or pentaacrylates, or mixture thereof with monoacrylates and/or diacrylates so that the mixture has an average of greater than 2 double bonds per molecule. Preferred monomers are trimethylol propane tris-acryloxy propionate, trimethylol ethane tris-acryloxy propionate, pentaerythritol acryloxy propionate, trimethylol propane tris-acrylate, trimethylol ethane tris-acrylate, pentaerythritol tetraacrylate, ethoxylated trimethylol propane triacrylate, propoxylated trimetholol propane triacrylate, ethoxylated trimethylol ethane triacrylate, propoxylated trimetholol ethane triacrylate, ethoxylated pentaerythritol triacrylate, and propoxylated pentaerythritol triacrylate.

The binder composition also includes about 5 to 15% by weight multifunctional mercaptan or mercaptans. A preferred group of mercaptans is trimethylolethane tris(3-mercaptopropionate); trimethylolpropane tris(3-mercaptopropionate); pentaerythritol tetra(3-mercaptoproprionate); dipentaerythritol hexa(3-mercaptopropionate); glycol di(3-mercaptopropionates); trimethylolethane trimercaptoacetate; trimethylolpropane trimercaptoacetate; pentaerythritol tetra(mercaptoacetate); dipentaeryIthritol hexa(mercaptoacetate); glycol di(mercaptopropionate); 2,2'-dimercaptodiethyl ether; trivinylcyclohexylpoly mercaptan; trithiocyanuric acid; and 2,5-dimercapto-1,3,4-thiadiazole. In addition to the polyunsaturated monomer and multifunctional mercaptan, the binder compositions contain about 0.001 to about 0.15% by weight vanadium in the form of vanadium compound. Sufficient vanadium compound is present to provide said amounts of vanadium. The vanadium compound is generally in the form of vanadium complexes of organic acids or vanadium alcoholates, vanadium sulfates, vanadium chlorides and the like and is preferably vanadium acetylacetonoate or vanadium triacetylacetonoate.

In addition, the binder compositions optionally contain oligomeric polyene in an amount of about 0.1 to about 60% by weight of the binder composition. Suitable organic oligomeric polyenes are saturated oligomeric polyesters or polyethers capped with acryloyloxy groups through diisocyanate/hydroxyethylacrylate (urethane) reactions on polyester or polyether polyols; acryloyloxy, methacryloyloxy, acrylamide or methacrylamide functional resins prepared by condensation of unsaturated monomers with melamine resins; acryloyoxy or methacryloyloxy functional resins prepared by condensation of unsaturated monomers with epoxy resins; alkyd or epoxy ester resins containing drying oil fatty acids; acrylate or methacrylate functional resins prepared by addition of glycidyl or isocyanatofunctional acrylate/methacrylate to carboxyl or hydroxy functional resins; acrylate or methacrylate functional resins prepared by addition of acrylic or methacrylic acid to glycidyl functional acrylic oligomers; acrylic oligomers with allyl ester functionality from free radical or ionic polymerization of monomer mixtures containing allyl methacrylate or acrylate; unsaturated polyesters containing maleic/fumaric unsaturation; and oligomers from monomer mixtures containing butadiene or isoprene by free radical or ionic polymerization.

In addition to the monomer, mercaptan, vanadium and optional oligomeric polyene, the binder composition also optionally contains about 0.1 to about 30% by weight of a polymer which is compatible with the composition. Suitable polymers of this type are selected from chlorinated rubber, acrylic copolymers with ureido functionality, vinyl chloride/vinyl acetate copolymers, and cellulose esters. Particularly preferred are acrylic polymers with ureido functionality and cellulose acetate butyrate.

In addition, the binder composition optionally but preferably contains up to about 5% of strong acid. Suitable strong acids are, for example, coreactive acid phosphates, paratoluene sulfonic acid, dodecylbenzene sulfonic acid, 2-ethylhexyl acid phosphate, and the like. Coreactive acid phosphates are the most preferred and examples thereof are hydroxy ethylmethacrylate acid phosphate and hydroxy ethylacrylate acid phosphate.

As is customary in this coatings field, the binder composition is generally used in combination with other materials in order to make a coating composition. For example, normal additives which can be used are solvents, pigments, reology modifiers, adhesion promotors, pigment dispersing aids, mar reducers, flatting agents and the like.

As to solvents, the commonly employed solvents for this type of coating composition are xylene, toluene, ketones, alcohols, hydrocarbons and the like. Up to 100% by weight based on binder of solvent can be present in the coating composition.

While the coating compositions of the invention can be pigmented or clear, when using a pigment the commonly employed ones are, for example, titanium dioxide, Cab-o-Sil®, red iron oxide, Ropaque® OP-42 opaque polymer having a hollow core, and the like. The coating compositions are applied to a substrate and cured under ambient conditions at temperatures as low as even sub-zero (°F.) and even hot indoor or outdoor conditions in about 5 minutes to about 2 hours, depending on particular composition and the ambient conditions involved. The resultant coatings have a Knoop hardness number of at least 2 and preferably have a Knoop hardness of about 3 to 15 and have high humidity resistance, durability and solvent resistance. The coating compositions do not require any radiation cure as is typically required in the prior art, and so can be applied either indoors or outdoors under almost any conditions.

To further illustrate a few embodiments of the invention, the following examples are presented in which all parts and percentages are by weight unless otherwise indicated.

The symbol * indicates comparative example.

EXAMPLES 1-24

Films were drawn from compositions having as major components (a) an oligomer having acrylate double bonds, (b) monomers having one to three acrylate or methacrylate double bonds/molecule, and (c) multifunctional mercaptan. The oligomer used was Uvithane 893, an acrylated polyester/urethane. The films contained vanadium and strong acid. Data were obtained on tack-free time and film appearance, hardness and solvent resistance (pencil hardness before and after 10 second spot with methylethylketone). Results are shown in the following tabulation, and details of the formulations and tests are provided in notes following the tabulation. In examples 1-10, the Uvithane 893 was diluted with toluene prior to making the final mixture. In examples 11-24, the Uvithane was diluted with either Chemlink 176 (ethoxylated trimethylolpropane triacrylate) or phenoxyethylacrylate. In examples 1-10, the vanadium solution was added as the last component, and the mixtures drawn as soon as mixing was complete. In examples 11-24, a premix of the acid, mercaptan, and alphamethylstyrene was the last addition, with the mixtures again drawn as soon as mixing was complete.

The data show that with monomers having one double bond/molecule, cure is very poor. In the one example where a tackfree film was obtained (#10), the film did not have significant solvent resistance, becoming softer than the softest pencil with 10 second exposure to MEK.

TABLE I

| Ex. No. | Protocol (see notes) | Monomer | Double Bonds per Monomer | Tackfree Time | Film Wrinkling | Cured Pencil Hardness As Is | Cured Pencil Hardness 10 sec MEK |
|---|---|---|---|---|---|---|---|
| 1 | 70A | Ethoxylated TMP triacrylate ("CL-176") | Three | <3 hours | Slight | H | HB |
| 2* | " | Hexanedioldimethacrylate | Two | 1-12 days | Moderate | H | F |
| 3* | " | Hexanedioldiacrylate | Two | 1-12 days | Moderate | HB | 2B |
| 4* | " | Tetraethyleneglycoldimethacrylate | Two | 1-12 days | Moderate | H | HB |
| 5* | " | 2-Ethylhexylacrylate | One | >12 days | Severe | | |
| 6* | " | 2-Ethylhexylmethyacrylate | One | >12 days | Severe | | |
| 7* | " | Isodecylacrylate | One | >12 days | Severe | | |
| 8* | " | Isodecylmethacryllate | One | >12 days | Severe | | |
| 9* | " | Paramethylstyrene | One | >12 days | Severe | | |
| 10* | " | Phenoxyethylacrylate | One | 1-12 days | Moderate | HB | <6B |
| 11 | 74A4 | CL-176 | Three | 17-24 min. | Slight | HB | B |
| 12* | " | Phenoxyethylacrylate | One | >7 days | Severe | | |

TABLE I-continued

| | | | | | | | | |
|---|---|---|---|---|---|---|---|---|
| 13 | 75A2 | CL-176 | Three | <30 min. | Slght | | H | HB |
| 14* | " | Phenoxyethylacrylate | One | >6 days | | | | |
| 15 | 75A4 | CL-176 | Three | <30 min. | Slight | | H | HB |
| 16* | " | Phenoxyethylacrylate | One | >6 days | | | | |
| 17 | 75B2 | CL-176 | Three | 9-25 min. | Slight | | H | HB |
| 18* | " | Phenoxyethylacrylate | One | >6 days | | | | |
| 19 | 75B4 | CL-176 | Three | 10-24 min. | Slight | | F | HB |
| 20* | " | Phenoxyethylacrylate | One | >6 days | | | | |
| 21 | 75C2 | CL-176 | Three | 10-28 min. | Slight | | H | <6B |
| 22* | " | Phenoxyethylacrylate | One | >6 days | | | | |
| 23 | 75C4 | CL-176 | Three | 9-27 min. | Slight | | F | HB |
| 24* | " | Phenoxyethylacrylate | One | >6 days | | | | |

PROCTOCOLS TO TABLE I

| Protocol | Acid Type | Acid Level | Mercaptan Type | Vanadium Level | Monomer Level | Oligomer Level | Mercaptan Level | Toluene Level | MEK Level | Alphamethyl styrene Level | Gate (mils) /Days Cure |
|---|---|---|---|---|---|---|---|---|---|---|---|
| 70A4 | DDBSA | 0.2 | TMPTMP | 0.02 | 47.8 | 42.0 | 10.0 | 18.0 | 13.4 | none | 4/12 |
| 72A4 | DDBSA | 0.4 | TMPTMP | 0.03 | 40.0 | 50.0 | 10.0 | 21.4 | 20.0 | none | 4/11 |
| 74A4 | DDBSA | 0.5 | TMPTMP | 0.01 | 45.0 | 45.0 | 10.0 | none | 7.0 | 4.5 | 4/8 |
| 75A2 | DDBSA | 0.2 | TMPTMP | 0.01 | 45.0 | 45.0 | 10.0 | none | 7.0 | 4.8 | 2/7 |
| 75A4 | " | " | " | " | " | " | " | " | " | " | 4/7 |
| 75B2 | DDBSA | 0.2 | PETMP | " | " | " | " | " | " | " | 2/7 |
| 75B4 | " | " | " | " | " | " | " | " | " | " | 4/7 |
| 75C2 | HAP | 0.5 | TMPTMP | " | " | " | " | " | " | 4.5 | 2/7 |
| 75C4 | " | " | " | " | " | " | " | " | " | " | 4/7 |

Notes to Table 1
(1) Hardness of tack-free films measured by pencil hardness that will not penetrate film to substrate (ASTM D 3363-74).
(2) Solvent resistance measured by pencil hardness after 10 seconds exposure to methylethylketone (MEK).
(3) Decreasing values of pencil hardness are 2H, H, F, HB, B, 2B, 3B, 4B, 5B, 6B, <6B.
(4) The oligomer is Uvithane 893 (Thiokol), a multifunctional acrylated oligomer from poly(ethylene adipate), diisocyanate, hydroxyethylacrylate.
(5) With protocol 70A4, only difunctional or trifunctional monomers gave films having solvent resistance. Phenoxyethylacrylate was the only monounsaturated monomer giving a tack-free film.
(6) The other protocols (less strong acid co-catalyst) did not give tack free films with phenoxyethylacrylate, while rapid hardening to tack-free films was obtained with ethoxylatedTMPtriacrylate.
(7) Ethoxylated TMP triacrylated = ethoxylated trimethylolpropane triacrylate, approximately 3.3 ethyleneoxide groups/molecule, sold by Ware Chemical with tradename Chemlink 176.
(8) Vanadium added as vanadylacetylacetonate solution in methylethylketone.
(9) Films drawn on phosphatized cold rolled steel (Bonderite 1000) with drawdown block gate sizes shown below.
(10) Coatings comprised of monomer/oligomer/multifunctional mercaptan/acid co-catalyst with volatile components being methylethylketone/toluene/alphamethylstyrene. Compositions shown below as weight % based on sum of monomer + oligomer + mercaptan + acid.
(11) Days between drawing film and measurement of pencil hardness and solvent resistance shown below.
(12) DDBSA = dodecylbenzenesulfonic acid
HAP = hydroxyethylmethacrylate acid phosphate
TMPTMP = trimethlolpropanetrimercaptopropionate
PETMP = pentaerythritoltetramercaptopropionate

EXAMPLES 25-45

The protocols for these examples are similar to those of examples 11-24 except that the oligomer is dipropylene glycol fumarate instead of Uvithane 893. Dipropylene glycol fumarate is an extremely reactive unsaturated polyester resin due its high content of fumarate unsaturation. Table II shows the advantages of the compositions of the invention as to tack-free time, film wrinkling, and hardness. Extremely poor cure is obtained with either phenoxyethylacrylate or tert-butylstyrene as monomer. Even with the trifunctional acrylic monomer, the cured films show more wrinkling with the polyester oligomer than with the acrylate-functional oligomer for three out of the four thick (4 mil gate) protocols (compare examples 25, 31, and 37 with 11, 15 and 19).

TABLE II

| Ex. No. | Protocol (see notes) | Monomer | Double Bonds per Monomer | Tackfree Time | Film Wrinkling | Cured Pencil Hardness As Is | 10 sec MEK |
|---|---|---|---|---|---|---|---|
| 25 | 74A4 | CL-176 | Three | <12 min. | Moderate | 2B | <6B |
| 26* | " | Phenoxyethylacrylate | One | >7 days | Severe | | |
| 27* | " | tert-Butylstyrene | One | >7 days | Slight | | |
| 28 | 75A2 | CL-176 | Three | <11 min. | Slight | H | HB |
| 29* | " | Phenoxyethylacrylate | One | >6 days | | | |
| 30* | " | tert-Butylstyrene | One | >6 days | | | |
| 31 | 75A4 | CL-176 | Three | <10 min. | Moderate | H | F |
| 32* | " | Phenoxyethylacrylate | One | >6 days | | | |
| 33* | " | tert-Butylstyrene | One | >6 days | | | |
| 34 | 75B2 | Cl-176 | Three | 8-17 min. | Slight | H | F |
| 35* | " | Phenoxyethylacrylate | One | >6 days | | | |
| 36* | " | tert-Butylstyrene | One | >6 days | | | |
| 37 | 75B4 | CL-176 | Three | 9-16 min. | Moderate | F | HB |
| 38* | " | Phenoxyethylacrylate | One | >6 days | | | |

TABLE II-continued

| Ex. No. | Proto-col (see notes) | Monomer | Double Bonds per Monomer | Tackfree Time | Film Wrinkling | Cured Pencil Hardness As Is | 10 sec MEK |
|---|---|---|---|---|---|---|---|
| 39* | " | tert-Butylstyrene | One | >6 days | | | |
| 40 | 75C2 | CL-176 | Three | <34 min. | Slight | 2H | B |
| 41* | " | Phenoxyethylacrylate | One | >6 days | | | |
| 42* | " | tert-Butylstyrene | One | >6 days | | | |
| 43 | 75C4 | CL-176 | Three | <33 min. | Slight | H | F |
| 44* | " | Phenoxyethylacrylate | One | >6 days | | | |
| 45* | " | tert-Butylstyrene | One | >6 days | | | |

EXAMPLES 46–49

These examples show the suprising requirement for use of multifunctional acrylates rather than multifunctional methacrylates to obtain films having durability toward high humidity.

A pigment grind was prepared using as dispersing resin a methacrylate functional oligomer (I) prepared by reaction of methacrylic acid with an oligomer having composition 26MMA/50EA/24Glycidyl Methacrylate.

Paints were prepared from this grind to give 40/60 titanium dioxide/binder, with the binder having the composition shown in Table III:

TABLE III

| Binder Component | Weight % |
|---|---|
| Oligomer (I) | 26.7 |
| Trimethylolpropanetris(3-mercaptopropionate) | 7.0 |
| Trifunctional monomer | 64.1 |
| Acid phosphate from hydroxyethylmethacrylate/phosphorus pentoxide reaction (HEMA acid phosphate) | 2.2 |

The paints also contained 5 parts by weight of alphamethylstyrene per 100 parts of binder.

The trifunctional monomers used were:
Acryloxypropionic acid ester of trimethylolpropane (acrylate A)
Acrylic acid ester of ethoxylated trimethylolpropane (acrylate B)
Methacrylic acid ester of ethoxylated trimethylolpropane (methacrylate B)
Methacrylic acid ester of trimethylolpropane (methacrylate A)

Portions of the four paints were formulated with vanadium by adding vanadyl isopropylate to give 0.02% by weight vanadium on binder. These films cured at ambient laboratory conditions. The dry film thickness was 1.5 mils.

After one week of ambient aging, the films were evaluated by exposure in a high humidity cabinet (100° F., atmosphere saturated with water by a mist) and in an accelerated weathering cabinet (QUV apparatus set to provide alternate cycles of UV radiation at 59° C. and condensing moisture at 44° C.). At intervals, the gloss of the panels was measured. The tabulation in Table IV shows initial gloss and gloss measured after various exposure times.

TABLE IV

| Example No. | 46 | 47 | 48* | 49* |
|---|---|---|---|---|
| Monomer Type | Acrylate | Acrylate | Methacrylate | Methacrylate |
| Monomer Abbrev. | A | B | A | B |
| Gloss (20/60 degree) | | | | |
| QUV Exposure | | | | |
| 0 hour | 81/87 | 81/89 | 82/87 | 84/90 |
| 122 hour | 77/86 | 26/64 | 2/1 | 1/8 |
| 213 hour | 60/81 | 8/42 | | |
| 333 hour | 50/76 | | | |
| 452 hour | 33/67 | | | |
| 623 hour | 12/57 | | | |
| High Humidity Exposure | | | | |
| 0 hour | 85/87 | 82/87 | 87/90 | 88/89 |
| 215 hour | 77/86 | 75/86 | 59/81 | Blistered |
| 456 hour | 75/84 | 73/83 | 52/76 | |
| 627 hour | 71/82 | 70/83 | 46/75 | |

EXAMPLES 50–52

These examples again show the surprising and critical advantage of acrylate relative to methacrylate in the multifunctional monomer component.

A pigment grind was prepared using DuPont R-960 grade titanium dioxide pigment and chlorinated rubber dissolved in butyl acetate as pigment carrier. The grind was formulated with multifunctional monomer, multifunctional mercaptan, vanadium, and plasticizer/solvent to adjust hardness and viscosity. Alphamethylstyrene was used as a component of the volatile solvent to improve pot stability. The formulation details are shown in Table V. The mercaptan was added last and films drawn shortly after mixing on phosphatized cold rolled steel (Bonderite 1000).

TABLE V

| Component | Weight |
|---|---|
| Grind: | |
| Titanium Dioxide (R-960) | 7.29 |
| Chlorinated Rubber (Alloprene X-10) | 2.91 |
| n-Butyl Acetate | 1.76 |
| Letdown: | |
| Toluene | 0.52 |
| Methylethylketone | 0.78 |
| n-Propylacetate | 1.30 |
| alphaMethylstyrene | 1.25 |
| chlorinated plasticizer (Cereclor 42P) | 1.25 |
| Hydroxyethylmethacrylate acid phosphate | 0.34 |
| Multifunctional Monomer (various) | 9.70 |
| Vanadium solution | |
| Vanadyl isopropylate | 0.015 |
| Butyl cellosolve | 0.485 |
| Trimethylolpropanetris(3-mercaptopropionate) | 1.40 |
| | 29.00 |

The following monomers were compared:

Trifunctional acrylate derived from trimethylolpropane and acryloxy propionic acid (trisaopate).

Trifunctional acrylate derived from ethoxylated trimethylolpropane (about 3 moles EO/mole trimethylolpropane) and acrylic acid (Chemlink 176).

Trifunctional methacrylate derived from a similarly ethoxylated trimethylolpropane and methacrylic acid (Chemlink 177).

All films cured to a tack-free state in less than 3 hours. After one week aging under ambient laboratory conditions, measurents of hardness and impact resistance were performed and pieces of the panels exposed in the high humidity and accelerated weathering (QUV) cabinets. Gloss was measured at 60 and 20 degrees at various exposure times. Results are shown in Table VI.

TABLE VI

| Example Number | 50 | 51* | 52 |
|---|---|---|---|
| Multifunctional Monomer | trisaopate | Chemlink 177 | Chemlink 176 |
| Functionality of Multifunctional Monomer | Acrylate | Methacrylate | Acrylate |
| Knoop Hardness Number | 6.2 | 8.2 | 8.8 |
| Pencil Hardness | H | 3 H | 2 H |
| Reverse Impact (Inch-Pounds) | 10–12 | 2–4 | 8–10 |
| Gloss (20 deg/60 deg) | | | |
| QUV Exposure | | | |
| Initial | | 88/91 | 63/79 | 71/85 |
| 73 hours | | 83/89 | 4/24 | 44/73 |
| 172 hours | | 63/84 | | |
| 288 hours | | 50/75 | | |
| High Humidity Exposure | | | |
| Initial | | 88/91 | 66/79 | 75/85 |
| 92 hours | | 84/91 | 2/25 | 68/82 |
| 256 hours | | 76/87 | | 55/78 |
| 309 | | 69/82 | | 54/77 |

EXAMPLE 53–66

This series of examples further illustrates the suprising effectiveness of vanadium for cure in air of multifunctional monomer with multifunctional mercaptan. The test system was 100 (parts by weight) Chemlink 176 (trisacrylate of ethoxylated trimethylolpropane)/10 trimethylolpropanetri(3-mercaptopropionate)/10 alphamethylstyrene. Various transition metals were added to portions of the test system and films drawn. The amounts of additive shown are based on 5 grams of test mixture. These results are shown in Table VII.

TABLE VII

| Ex. | Additive | Cure to Solid as Thin Film (18 hr.) |
|---|---|---|
| 53* | .1 g of .4% iron as tris acetylacetonate | No |
| 54 | .1 g of .6% vanadium as vanadylisopropylate | Yes (Soft) |
| 55* | .3 g of .4% iron as tris acetylacetonate | No |
| 56 | .3 g of .6% vanadium as vanadylisopropylate | Yes (Soft) |
| 57* | .1 g of 9% iron as carboxylate (Nuodex) | No |
| 58 | .3 g of .6% vanadium as vanadylisopropylate +.1 g of Strodex MO-100 (octyl acid phosphate) | Yes (Hard) |
| 59* | .3 g of .4% iron as tris acetylacetonate + .1 g of Strodex MO-100 | No |
| 60* | .1 g of molybdic acid (87% MoO3) + .1 g Strodex MO-100 | No |
| 61* | .1 g of 8% copper as resinate + .1 g Strodex MO-100 | No |
| 62* | .1 g of 9% iron as carboxylate + .1 g Strodex MO-100 | No |
| 63* | .05 g of ferric acetylacetonate + .1 g Strodex MO-100 | No |
| 64* | .05 g of cobaltic acetylacetonate + .1 g Strodex MO-100 | No |
| 65* | .05 g of cobaltic acetylacetonate | No |
| 66 | .05 g of vanadylacetylacetonate | Yes (Hard) |

EXAMPLE 67

This example shows cure of a multifunctional acrylic monomer with mercaptan and vanadium as a function of strong acid concentration in the absence of pigment. Also shown in cure with a multifunctional aldehyde in place of the mercaptan. The cure is much faster with the mercaptan than with the aldehyde.

The common test system used is shown in Table VIII and the tack-free time results shown in Table IX.

TABLE VIII

| | Parts |
|---|---|
| Chemlink 176 (triacrylate of ethoxylated trimethylolpropane) | 5.0 |
| Curing Agent (mercaptan or aldehyde) | 0.5 |
| alphamethylstyrene | 0.3 |
| 0.63% vanadium from vanadylisopropylate in butyl cellosolve | 0.3. |

TABLE IX

Tack-free time of film, Zapon test, varying amount of paratoluene sulfonic acid, comparing mercaptan to aldehyde.

| Paratoluene sulfonic acid (Wt. % based on Chemlink 176) | trimethylolpropanetris (3-mercaptopropionate) Tack Free Time of Film | | dialdehyde* (Zapon test) | |
|---|---|---|---|---|
| | 0 g Zapon | 500 g Zapon | 0 g Zapon | 500 g Zapon |
| None | 420 min | 420 min <24 hour | Still wet at 24 hour | |
| 0.14 | 50 min | 53 min | (Set but still tacky at 24 hour) | |
| 0.28 | 15 min | 15 min | Not run. | |
| 0.41 | 12 min | 12 min | 147 min | 147 min |
| 1.38 | 15 min | 17 min | 99 min | 118 min |

Dialdehyde derived from ethyleneurea, formaldehyde, 2-ethyl-hexanal and isobutyraldehyde.

EXAMPLE 68

This example shows that a variety of strong acids are effective in the above test system with mercaptan and vanadium as curing agents for multifunctional acrylate, but that for excellent adhesion a copolymerizable strong acid such as HEMA acid phosphate, is superior.

TABLE X

| Test system for strong acids: | Parts |
|---|---|
| Chemlink 176 | 5.0 |
| Trimethylolpropanetris(3-mercaptopropionate) | 0.5 |
| 0.63% vanadium from vanadylisopropylate in butylcellosolve | 0.3 |
| alphamethylstyrene | 0.3 |

TABLE XI

| Ex. | Acid Type | Acid Level (wt. %) | Zapon 0 g (min) | 500 g | Loss of adhesion (millimeters) |
|---|---|---|---|---|---|
| 69 | Paratoluenesulfonic acid | 0.28 | 15 | 15 | 2 |
| 70 | HEMA Acid Phosphate | 0.28 | 28 | 39 | 0.5–1 |

TABLE XI-continued

| Ex. | Acid Type | Acid Level (wt. %) | Zapon 0 g | (min) 500 g | Loss of adhesion (millimeters) |
|---|---|---|---|---|---|
| 71 | Dioctylpyrophosphoric | 0.28 | 27 | 49 | 1.5 |
| 72 | Dimethylpyrophosphoric | 0.28 | 23 | 25 | 1.5 |
| 73 | Dibutylpyrophosphoric | 0.28 | 22 | 30 | 3 |
| 74 | Dodecylbenzenesulfonic | 0.28 | 23 | 26 | 2 |
| 75 | HEMA Acid Phosphate | 1.38 | 23 | 25 | 1 |
| 76 | Dioctylpyrophosphoric | 1.38 | 51 | 51 | 3 |
| 77 | Dibutylpyrophosphoric | 1.38 | 52 | 52 | 3 |
| 78 | Octylphosphoric (Strodex MO-100) | 1.38 | 11 | 14 | 4.5 |

I claim:

1. A composition suitable as a binder for high solids ambient cure coatings comprising about 25 to 95% by weight of binder of a polyunsaturated monomer having an average of greater than two double bonds per molecule, said monomer being selected from esters of acrylic acid and acryloxypropionic acid; about 5 to 15% by weight of binder of a multifunctional mercaptan; and a vanadium compound providing about 0.001 to 0.15% by weight of binder of vanadium.

2. The composition of claim 1 wherein said monomer is one or more monomers selected from the group consisting of mono-, di-, tri-, tetra-, and pentaacrylates.

3. The composition of claim 1 further including about 0.1 to about 60% by weight oligomeric polyene excluding polyunsaturated monomers.

4. The composition of claim 1 further including about 0.1 to 30% by weight of a polymer, which is compatible with said composition, selected from the group consisting of chlorinated rubber, acrylic copolymers with ureido functionality, vinyl chloride/vinyl acetate copolymers and cellulose esters.

5. Composition of claim 1 further including up to about 5% by weight strong acid.

6. A composition according to claim 1 wherein said monomer is selected from the group consisting of trimethylol propane tris-acryloxy propionate, trimethylol ethane tris-acryloxy propionate, pentaerythritol acryloxy propionate, trimethylol propane tris-acrylate, trimethylol ethane tris-acrylate, pentaerythritol tetraacrylate, ethoxylated trimethylol propane triacrylate, propoxylated trimethylol propane triacrylate, ethoxylated trimethylol ethane triacrylate, propoxylated trimetholol ethane triacrylate, ethoxylated pentaerythritol triacrylate, and propoxylated pentaerythritol triacrylate.

7. Composition of claim 1 wherein said mercaptan compound is selected from the group consisting of trimethylolethane tris(3-mercaptopropionate); trimethylol propane tris(3-mercaptopropionate); pentaerythritol tetra(3-mercaptopropionate); dipentaerythritol hexa(3-mercaptopropionate); glycol di(3-mercaptopropionates); trimethylolethane trimercaptoacetate; trimethylolpropane trimercaptoacetate; pentaerythritol tetra (mercaptoacetate); dipentaerythritol hexa(mercaptoacetate); glycol di(mercaptopropionate); 2,2'-dimercaptodiethyl ether; trivinylcyclohexylpoly mercaptan; trithiocyanuric acid; and 2,5-dimercapto-1,3,4-thiadizaole.

8. Composition according to claim 1 wherein said vanadium compound is selected from the group consisting of vanadyl acetylacetonate, vanadium trisacetylactonate, vanadium chlorides, vanadium sulfates, vanadium alcoholates, and vanadium complexes of organic acids.

9. Coating composition comprising binder in accordance with claim 1 and up to 100% by weight pigment based on binder, said coating composition binder curing at ambient conditions, and having high humidity resistance and good weatherability.

10. Coating composition in accordance with claim 9 where the resultant coating has a Knoop hardness number of at least 2.

11. Coating composition in accordance with claim 10 wherein the number is about 3 to 15.

12. Coating composition in accordance with claim 9 further including up to 100% by weight based on binder of solvent.

13. Articles coated with the coating composition of claim 9, said composition being cured under ambient conditions and forming a coating with high humidity resistance.

14. Articles of claim 13 wherein the coating has a Knoop hardness number of at least 2.

* * * * *